Figure 1:
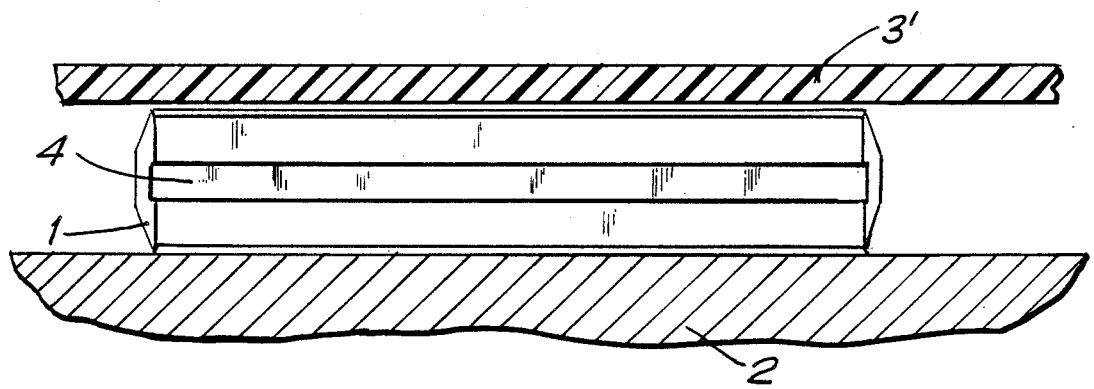

United States Patent [19]
Böswarth

[11] Patent Number: 4,938,105
[45] Date of Patent: Jul. 3, 1990

[54] METHOD OF MANUFACTURING A ONE-SIDED OR TWO-SIDED PUNCHING KNIFE FOR NON-METALLIC MATERAILS

[75] Inventor: Leopold Böswarth, Vienna, Austria

[73] Assignee: Martin Miller Aktiengesellschaft

[21] Appl. No.: 285,094

[22] Filed: Dec. 15, 1988

[30] Foreign Application Priority Data

Dec. 18, 1987 [AT] Austria ................................. 3354/87

[51] Int. Cl.$^5$ ............................................. B23P 15/24
[52] U.S. Cl. ...................................... 76/107.8; 83/652
[58] Field of Search .......................... 76/107 R, 107 C; 83/652

[56] References Cited

U.S. PATENT DOCUMENTS 2,298,041 10/1942 Dedrick ............................ 76/107 C
3,459,090 8/1969 Prew ................................. 76/107 C Primary Examiner—Roscoe V. Parker
Attorney, Agent, or Firm—Toren, McGeady & Associates

[57] ABSTRACT

A method for fabrication of a one-sided or two-sided punching knife (1) for non-metallic materials such as leather, textiles, paper, etc. with a groove (4) lying on the inside and reinforcing plate (3) engaging into the groove. The reinforcing plate (3) is of non-metallic material and is stamped out by the knife (1) which it is intended to reinforce.

15 Claims, 2 Drawing Sheets

METHOD OF MANUFACTURING A ONE-SIDED OR TWO-SIDED PUNCHING KNIFE FOR NON-METALLIC MATERAILS

The invention is directed to a method for fabrication of a one- or two-sided punching knife for non-metallic materials such as leather, textiles, paper, etc. with a groove located on the inner side and a reinforcement plate engaging into the groove, as well as a steel strip for performing the method.

Punching tools of the type to be produced are known from DE-OS No. 1 511 073 and U.S. Pat. No. 2,298,041. They are, for instance, bent from steel strip, possibly around the finished reinforcing plate. The reinforcing plates from timber, cardboard, plastic material or metal are manufactured in a suitable manner, for instance, by saws, whereupon they are inserted into the knife or the knife is bent around them and connected with them.

In the punching knives corresponding to the state of the art, it is necessary to fabricate the individual reinforcement plates for the individual garment sizes of leather or textile parts expensively, piece by piece, and to connect them with the punching knives.

Punching knives are also known which do not have reinforcing plates, rather rod-shaped stiffening elements inside of the knife. Herein the attachment of the reinforcing rods, mostly by welding, is at least as expensive and time consuming as the insertion of a reinforcing plate. The plate has the advantage herein of stiffening and supporting the punching knife uniformly across the entire periphery.

The assembly of the knives used hitherto is, as can be gathered from the above, time consuming and expensive. The invention has set itself the task of indicating a fabrication method for a punching knife of the type mentioned above, which can be simply and economically performed. Herein it should be easily possible to place certain attachments such as hole punches, inside knives, seam drawing line devices and marking pins simply and durably without great effort in the reinforcement plate.

These aims are achieved in the invention by means of a fabrication method where the reinforcement plate consists of non-metallic material, preferably plastics material, wherein its thickness corresponds at least approximately to the width of the groove, and where it is punched out by the knife which it is intended to reinforce.

It is possible in this manner to punch a suitable reinforcement plate from a larger piece with the shaped knife and in one work pass at the same time to press it into the groove of the knife. Up until now it has not been deemed possible to perform this punching process with a not yet stiffened knife.

In one embodiment known as such, the ends of the knife are connected with each other (welded) and the knife is connected with the reinforcing plate, for instance by bolting, soldering or welding. With this a particularly stable knife design withstanding also the highest stresses is achieved, wherein because of the already performed insertion of the plate into the groove, the subsequent connection is simpler than has been usual hitherto.

In the particularly expedient embodiment of the method of the invention, the usual installations are punched into the reinforcing plate, possibly after a pre-drilling process and after the reinforcing plate has been pressed into the knife; these installations include hole punches, inside knives, seam drawing line devices and marking pins. It is an unanticipated advantage of the punching knife obtained by the invention that the attachment of such installations is possible by a punching process in an easy and economical manner. Herein installations or attachments with knife edges are produced by punching-in the invention while, for installations or attachments without knife edges, generally speaking a pre-drilling of the reinforcing plate is necessary. Installations or fittings are used which incorporate a groove at their side facing the reinforcing plate which expediently corresponds to the groove in the knife.

In detail, the inventive method for fabrication of a punching knife is performed in such a way, that the finish-bent knife, which possibly is closed at its ends, is placed upon a fixed support, that a plate from the material of which the reinforcing plate is to be fabricated is arranged above the knife and is punched into the knife by means of devices common in punching technology, whereby the reinforcing plate comes to lie in the groove.

It is also possible to place the knife upon the plate or to fasten it at the upper portion of the press and to perform the punching process subsequently.

In this punching process it is also possible to punch-in inside knives at the same time, if the shape and the dimensional conditions of the knife permit this.

Preferably strip steel is used for the knife, which can be easily brought into the desired shape by the usual method. It is advantageous to use a strip steel which already comprises cutting edges and the groove prior to the bending process.

It is particularly favorable for fabrication and for the mechanical properties of the knife, if the bottom of the groove is aligned with the knife edge in punching direction. This means for two-edged punching knives that the bottom of the groove lies on the line connecting the two knife edges.

Preferably, plastics material plates are used as reinforcing plates, for instance, polyolefin, polyethylene or acrilate. Such plates have a Shore hardness D of 75, which requires a pressing in force of 45 kN if a 9 mm high and 2.3 mm thick punching knife is used and if the plate thickness is 4 mm and the plate size approximately 100×50 mm. The pressing in force depends mainly upon the length, however also upon the surface and the shape of the knife.

In connection with the fabrication of the knife in the invention, we mean here processes functioning in sudden bursts as well as continuously when using the designations "punching-in", "punching", "pressing" and "pressing-in". Such processes are cutting with blades, i.e., workpieces are divided by means of a usually conical cutting edge, and, in special cases it is also possible to cut with cutting shears, i.e., workpieces are divided by means of two cutting edges which are moved past each other, especially if the bottom of the groove does not lie at the point of the knife indicated above.

The application of the invention to a specific problem is easy for the specialist if he knows the invention.

Figure 2:
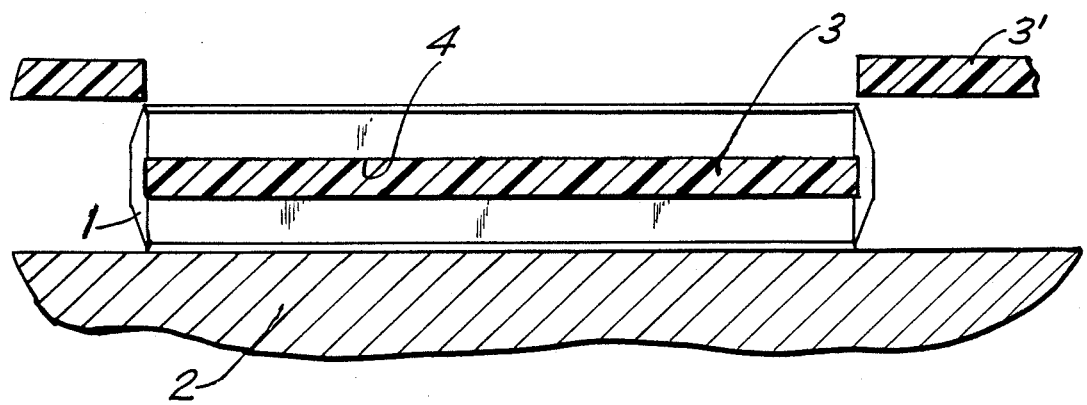

The invention is described with particularity with the help of the drawing. Herein, FIG. 1 shows a punching knife of the invention prior to punching-in the reinforcing plate; FIG. 2 shows a punching knife after punching-in the reinforcing plate; and FIG. 3 shows a finished punching knife with fittings or installations, partially in section.

A plate 3', from which the reinforcing plate 3 is to be punched, lies above the knife 1 on a finish-bent punching knife 1 which rests upon a fixed or solid support 2. This plate is pressed against the knife 1 by devices common in the punching industry and arrives finally in the position depicted in FIG. 2. The reinforcing plate 3 rests with its punched out edges in the groove 4 and is held by this groove. The punching knife is thus finish-fabricated in a single working process; it can, however, be further stiffened by connecting the knife with the reinforcing plate. It is necessary to connect the knife ends with each other already prior to stamping the reinforcing plate; this is done preferably by welding.

Figure 3:
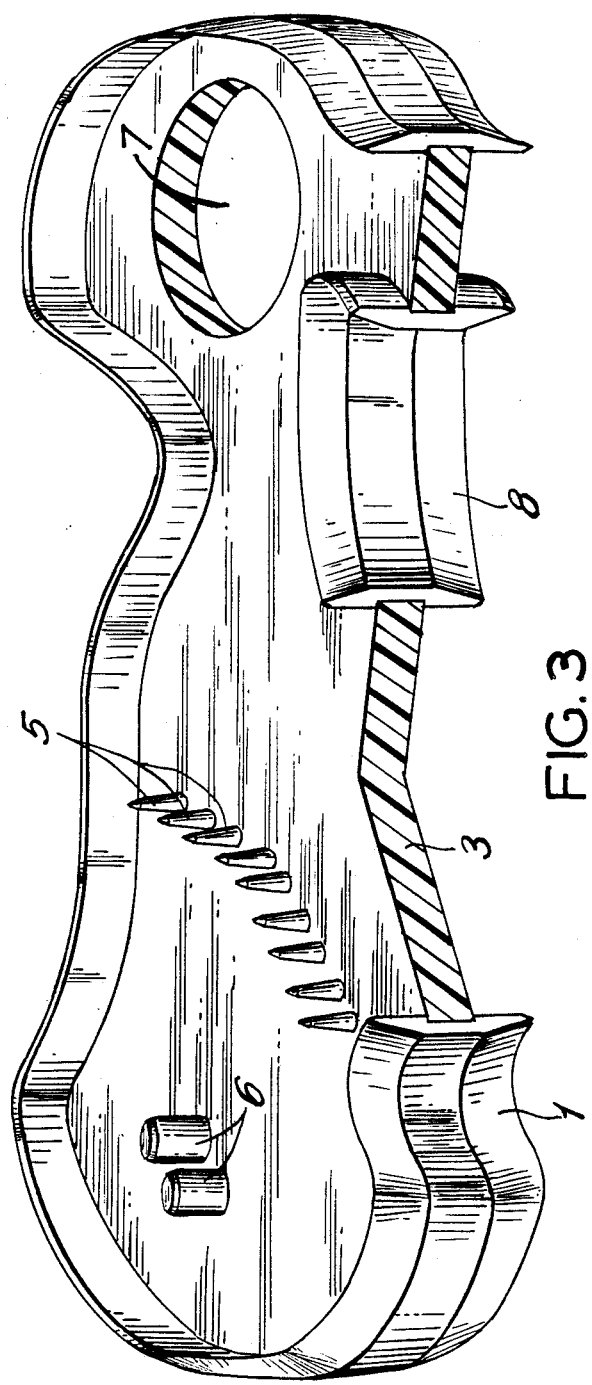

A punching knife in the invention with fittings is depicted in FIG. 3 partially in section. In the installations or fittings we are dealing with two hole cutters 6 and with a row of marking pins 5, forming a seam drawing line. An inside knife 8 is depicted in section, whereby its groove in the region of the reinforcing plate 3 is made visible. In the depicted punching knife an aperture 7 is additionally provided in the reinforcing plate 3, which results in a reduction of the weight of the punching knife and facilitates its handling. This aperture also facilitates the removal of the stamped out goods from the knife.

The method in the invention can be modified and refined in various ways. Thus, it is not necessary to press the plate in from above, and the reinforcing plate can be provided with the fittings or installations also prior to being stamped in, if this is desirable. Particularly when using thicker reinforcing plates it is possible to press against the knife with a pressure device which is also provided with a knife edge (opposite the knife edge of the punching knife or also offset to said knife edge); this facilitates the division process.

The invention is directed also to punching knives which have been produced in accordance with the method in the invention.

I claim:

1. In a method of manufacturing a one-sided or two-sided punching knife for non-metal materials, such as leather, textiles, paper, the knife having an inner side, a groove having a width being defined in the inner side, a reinforcing plate of a non-metal material engaging in the groove, the reinforcing plate having a thickness which corresponds at least approximately to the width of the groove, the improvement comprising stamping the reinforcing plate from the non-metal material by means of the knife which the reinforcing plate is intended to reinforce.

2. The method according to claim 1, wherein the non-metal material of the reinforcing plate is plastics material.

3. The method according to claim 1, comprising placing the punching knife which is bent and closed at its ends between a pressure plate and a plate of the non-metal material from which the reinforcing plate is to be stamped, and punching the reinforcing plate into the knife until the reinforcing plate is engaged in the groove.

4. The method according to claim 1, comprising fixedly connecting the reinforcing plate with the punching knife.

5. The method according to claim 1, wherein the knife is fixedly connected with the reinforcing plate by bolting, soldering or welding.

6. The method according to claim 1, comprising, after the reinforcing plate is engaged in the groove, punching hole punches into the reinforcing plate.

7. The method according to claim 1, comprising, after the reinforcing plate is engaged in the groove, punching inside knives into the reinforcing plates.

8. The method according to claim 1, comprising, after the reinforcing plate is engaged in the groove, punching seam drawing lines into the reinforcing plates.

9. The method according to claim 1, comprising after the reinforcing plate is engaged in the groove, punching marking pins into the reinforcing plate.

10. A one-sided or two-sided punching knife for non-metal materials, such as leather, textiles, paper, the knife having an inner side, a groove having a width being defined in the inner side, a reinforcing plate of non-metal material engaging into the groove, the reinforcing plate having a thickness which corresponds at least approximately to the width of the groove, the reinforcing plate being stamped from the non-metal material by means of the knife which the reinforcing plate is intended to reinforce.

11. The punching knife according to claim 10, wherein the punching knife is fixedly connected to the reinforcing plate by bolting, soldering or welding.

12. The punching knife according to claim 10, wherein the reinforcing plate comprises hole punches punched into the reinforcing plate.

13. The punching knife according to claim 10, wherein the reinforcing plate comprises inside knives punched into the reinforcing plate.

14. The punching knife according to claim 10, wherein the reinforcing plate comprises seam drawing lines punched into the reinforcing plate.

15. The punching knife according to claim 10, wherein th reinforcing plate comprises marking pins punched into the reinforcing plate.

* * * * *

UNITED STATES PATENT AND TRADEMARK OFFICE
CERTIFICATE OF CORRECTION

PATENT NO. : 4,938,105
DATED : July 3, 1990
INVENTOR(S) : Leopold Böswarth

It is certified that error appears in the above-identified patent and that said Letters Patent is hereby corrected as shown below:

On the title page and in column 1, lines 2-4, the title should read

--[54] METHOD OF MANUFACTURING A ONE-SIDED OR TWO-SIDED PUNCHING KNIFE FOR NON-METALLIC MATERIALS--.

Signed and Sealed this

Twenty-second Day of January, 1991

Attest:

HARRY F. MANBECK, JR.

*Attesting Officer*     *Commissioner of Patents and Trademarks*